Dec. 15, 1942.  M. WATTER  2,305,397
WELDED JOINT
Filed March 8, 1941   2 Sheets-Sheet 1
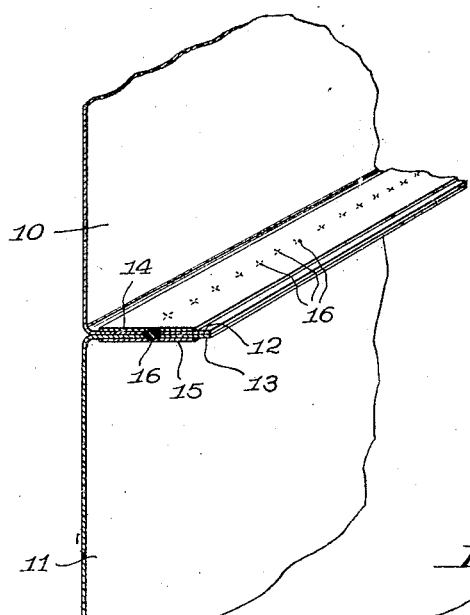
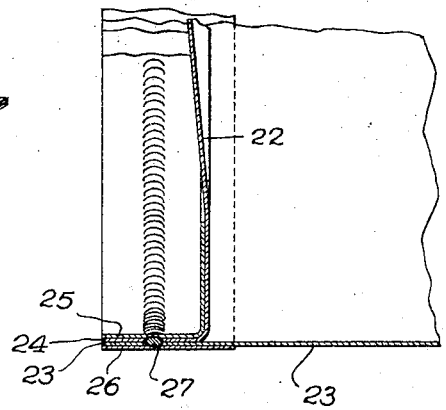
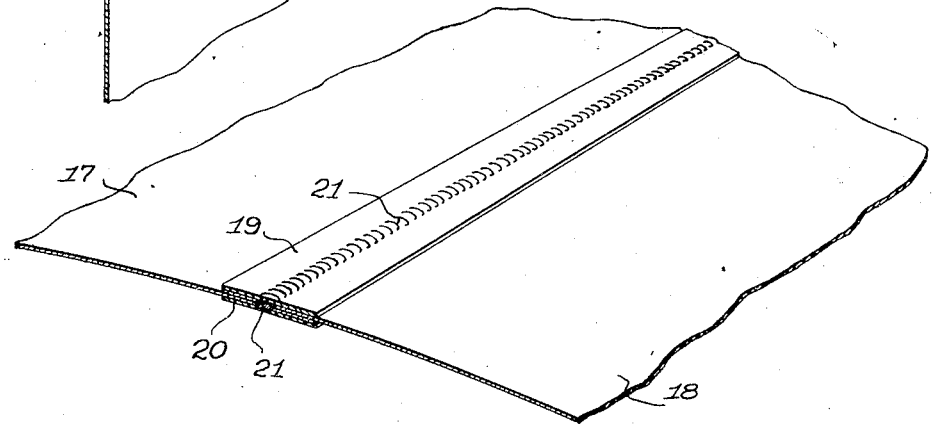
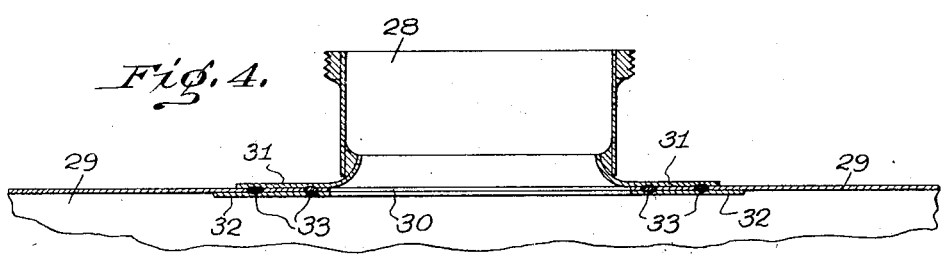
INVENTOR
Michael Watter
BY John P. Tarbox
ATTORNEY

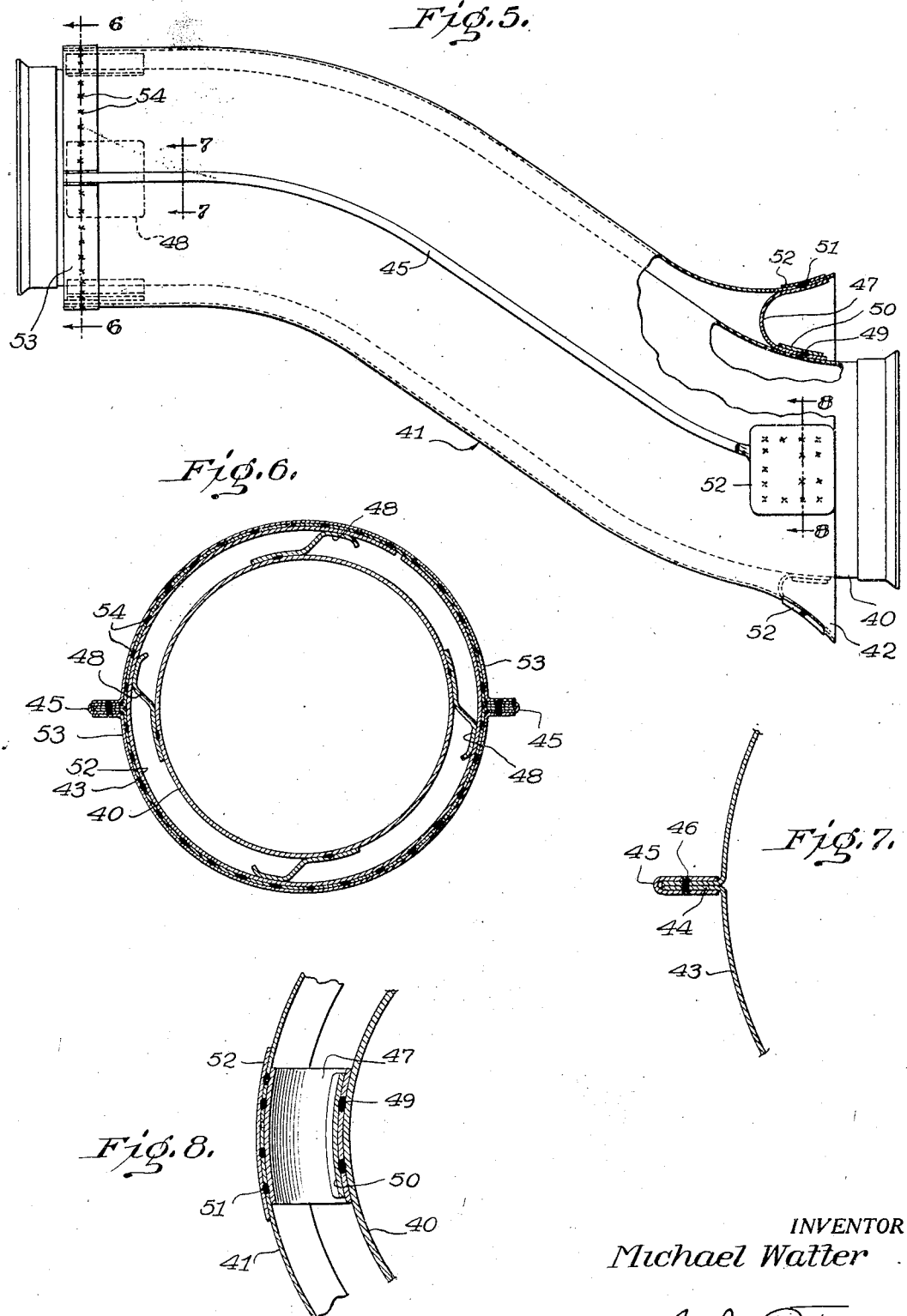

Patented Dec. 15, 1942

2,305,397

UNITED STATES PATENT OFFICE 2,305,397

WELDED JOINT

Michael Watter, Philadelphia, Pa., assignor to Edward G. Budd Manufacturing Company, Philadelphia, Pa., a corporation of Pennsylvania Application March 8, 1941, Serial No. 382,330

2 Claims. (Cl. 189—34)

This invention, which is a continuation-in-part of my copending application, Serial No. 293,750, filed September 7, 1939, relates to joints for relatively thin gauge sheet metal in which the joint connection is made by electric resistance welding.

In various industries, particularly in the aircraft industry, lightness in weight is a major factor and thin gauge stainless steel, because of its lightness in weight and high tensile strength, is coming into extensive use.

Heretofore, it has been the practice, when it is desired to join two thin sheets of metal, to employ electric resistance welding to spot or seam weld the sheets. In such constructions no difficulty is encountered when the welds are subjected to shear stresses, but when the metal sheets are subjected to vibration, such as in the case of fuel tanks for aircraft, which vibration imposes tension stress directly upon the spot welds, considerable difficulty is encountered. These stresses concentrate around the welds, and, due to the thinness of the sheets, the metal thereof fatigues with the result that the welds, after being subjected to continuous or repeated vibrations, become ruptured, frequently tearing loose from one or the other of the sheets.

It is an object of the present invention to provide a resistance-welded joint between thin gauge sheet metal parts, particularly in parts subject to vibration, in which concentration of tension stresses in localized areas around the weld tending to separate the parts is eliminated or minimized, whereby fatigue failure of the welded joint due to vibration is substantially avoided.

Another object of the invention is to provide a resistance-welded joint of thin vibratory sheet metal parts in which the stress concentration due to vibration is concentrated at a region sufficiently distant from the weld proper as to prevent tearing action of the metal of the thin sheets at the weld.

A further object is to provide an exhaust pipe construction having a slip stream housing of thin resistance-welded sheet metal having new and improved means for predetermining the extent of distribution away from the weld or welds of what otherwise would be localized tension stresses tending to fatigue the welds.

With the foregoing and other objects in view, it will be apparent from the following detailed description, the present invention resides in the construction and arrangement of parts as hereinafter described and claimed, it being understood that changes can be made within the scope of the invention claimed without departing from the spirit of the invention.

Referring to the accompanying drawings which illustrate suitable embodiments of the invention, Fig. 1 is a fragmentary, sectional, perspective view showing a joint of the present invention between parallel flanges;

Fig. 2 is a fragmentary, sectional, perspective view showing the invention applied to a lap joint;

Fig. 3 is a vertical section taken through the shell and end member of a fuel tank or the like;

Fig. 4 is a fragmentary section taken through the filler or gauge neck of a fuel tank, illustrating the improved joint of the present invention;

Fig. 5 is an elevational view of an aircraft exhaust pipe in which the joint of the present invention is incorporated at different regions; and Figs. 6, 7 and 8 are transverse sections taken approximately on the lines 6—6, 7—7 and 8—8, respectively, of Fig. 5.

Referring to the accompanying drawings in which like numerals refer to like parts throughout the several views, the construction shown in Fig. 1 embodies aligned sheets 10 and 11 of relatively thin metal, the sheets being provided with lateral flanges 12 and 13, respectively, which are disposed in abutting relation. As here shown, the thickness of the flanges 12 and 13 is substantially the same, and, in accordance with the present invention, thin gauge sheet metal backing strips 14 and 15 are disposed in engagement with the flanges 12 and 13, respectively, and securely welded by resistance welding at spaced intervals, as indicated at 16 in Fig. 1. It is to be noted that the welds are made through the four thicknesses of the metal along a line substantially midway between the edges of the backing strips 14 and 15.

It is obvious that, when the thin sheets 10 and 11 are subjected to vibration, the vibratory movement of the sheets 10 and 11 sets up stresses which act transversely of the flanges 12 and 13 and tend to separate the flanges. By providing the backing strips 14 and 15, these stresses are concentrated along the edges of the backing strips 14 and 15. Were it not for the backing strips 14 and 15, these transverse stresses would localize adjacent the spot welds 16, and since they are, in effect, tension stresses, they would tend to fatigue of the metal and tear the metal of one of the flanges from the spot welds 16. In other words, such tension stresses would be concentrated directly on the spot welds. In the present case, however, it can be seen that by reason of the stiffening action of the backing strips 14 and 15 on flanges 12 and 13 for a substantial distance from the welds 16 toward the sheets 10 and 11, the transverse tension stresses are localized at some distance from the welds 16. It is obvious that the backing strips 14 and 15 may be of any desired width to predetermine the localization of those stresses resulting from vibration which would otherwise tend to rupture the welds.

In Fig. 2 a lap joint is illustrated which may be employed in the sheet metal portions forming the cylindrical body portion of an aircraft fuel tank. The two ends 17 and 18 of the thin sheet metal sheet are lapped an appreciable distance to provide proper space for welding to the backing strips 19 and 20, which are associated with the overlapping ends 17 and 18 in a manner similar to the strips 14 and 15 of Fig. 1 and welded in this case by electric resistance welds 21, as indicated in Fig. 2.

The type of joint shown in Fig. 3 is designed especially for connecting an end member 22 to a cylindrical wall 23 of a fuel tank. The member 22 is provided with a flange 24, which engages the interior surface of the cylindrical wall 23 at one end. These members are likewise made of thin gauge sheet stainless steel or similar material and are joined in a manner such as to space the deflections of the vibrating parts away from the welds.

A thin gauge sheet metal backing member 25 in the form of an angle is positioned with one arm thereof seating on the flange 24, while the other arm is positioned in surface engagement with the end member 22. The other sheet metal backing member is in the form of a band 26 extending about the cylindrical wall 23. The resistance welds 27 are made through the members 23, 24, 25 and 26, and it is to be noted that they are spaced some distance from the edges of the members 25 and 26 so that, as in previous cases, the stresses which would otherwise tend to separate the sheets of metal 23 and 24 are concentrated at points or regions spaced from the welds.

Fig. 4 illustrates the manner of attaching a gauge neck or filler 28 or other tubular part to the body 29 of a thin sheet metal. The body 29 has an opening 30 therein of a diameter substantially the same as that of the neck 28. An annular flange 31 extends from the neck 28 and rests on the body portion about the opening 30, while a backing member 32 in the form of a thin gauge flat annular ring is positioned inside the tank and engages the interior surface of the wall 29 about the opening 30. In this case, two circular rows of electric resistance welds 33 extend through and attach the flange 31, body 29 and backing strip 32 together.

In the forms of joints described, it is to be observed that extremely thin sheet metal, preferably high tensile strength stainless or other alloy steel, is used in the fabrication of the article and that the thin sheets are secured together by electric resistance spot or seam welding. In these forms, the thin sheets secured together are of substantially the same thickness or gauge.

In Figs. 5 to 8, inclusive, an exhaust pipe 40 is shown as having a slip stream housing 41 associated therewith, the housing being bell-mouthed at one end, as shown at 42 in Fig. 5. The housing 41 is of thin gauge sheet metal and is fabricated in two halves 43, each half having opposed radial flanges 44 which abut corresponding flanges of the other half.

In practicing the present invention, instead of employing two separate strips of backing material, a single U-shaped member 45 of a gauge substantially the same as that of the housing 41 is provided, as shown in Fig. 7, to fit over each pair of abutting flanges 44, the four thicknesses of metal being electric resistance welded, as indicated at 46.

The housing or shell 41 is supported in circumferentially spaced relation with respect to the pipe 40 by means of V-shaped clips 47 at the bell-mouthed end, and by clips 48 at the opposite end, which clips are spot welded to the pipe 41.

It will be noted that the clips 47 are of thinner gauge than the pipe 40 and that they are of thicker gauge than the housing 41.

The exhaust pipe illustrated is for an aircraft engine, and, accordingly, the thin housing 41 is subject to vibration stresses. Whereas in the previously described joints the metal of the two main pieces to be welded together are of the same gauge in which backing strips of substantially the same gauge are employed, corresponding pieces in the case of the exhaust pipe and housing are of different gauges.

In this case it is the part of thinner gauge which will fatigue when subjected to vibration. The present invention therefore contemplates backing up the thinner gauge part with a backing piece. This is shown in Figs. 5 and 8, wherein the portion of each clip 47, welded as indicated at 49 to the pipe 40, is backed up by a backing plate 50, and the housing portion welded as indicated at 51 to the clips, is backed up by a thin gauge backing plate 52. The bell-mouthed end of the housing is subjected to considerable vibration and, by employing the backing plates 50 and 52, the localization of the tension stresses is concentrated adjacent the edges of the backing plates rather than at the welds, thus minimizing the tendency of the thin metal to tear away from the spot welds.

Due to the narrow spacing at the opposite end of the housing 41, vibration strains are slight. However, in order to rigidly reinforce this end, a heavier gauge band of metal 52 is disposed between the interior of the housing and the clips 48, and a band 53 of thinner gauge metal is disposed around the external surface of the housing, the two bands being spot welded to each other through the metal of the housing, as indicated at 54 in Fig. 6, the inner band 52 merely being seated on the clips 48.

In the case of thin connected sheets subjected to vibration in a lateral direction, such as what is commonly known as "drumming" or "diaphragming," it can be seen from the illustrations given that were it not for the backing members associated with the welds, tension stresses would be imposed directly at the edges of the welds, which would thus cause the joint to fatigue. The edge portions of the backing strips or plates described lend support to the sheet material at points remote from the particular welds and serve to dampen the lateral vibrations. Also, the span of metal between such edge portions and the welds restrains the sheet material against bending or deflection at the welds. The vibrations which otherwise would produce fatigue stresses at the welds are thus absorbed over a large area surrounding the welds with the result that the concentration of any such stresses is at a region remote from the welds.

In joint constructions of considerable length, such as shown in Figs. 1 and 2, I have found in the use of the present invention that a superior joint is produced by so arranging the line of electric resistance spot welds that they are tangent to each other, that is, each spot weld is substantially in engagement with the adjoining weld or welds, as the case may be, to provide a substantially continuous weld.

The present invention is applicable to many uses wherein thin gauge sheet metal is employed, particularly where a thin vibratory panel is connected with an adjoining panel or part. Accordingly, the invention is not restricted to the particular forms and arrangements of the parts shown and described, its scope being indicated by the appended claims rather than by the foregoing description, and, therefore, all changes which come within the meaning and range of equivalency of the claims are intended to be embraced therein.

What is claimed is:

1. In a device having a tubular portion, a thin gauge sheet metal shell surrounding said tubular portion in spaced relation, a plurality of metal elements disposed between said shell and tubular portion to space the same at one end, said elements being spot welded to said tubular portion, thin gauge sheet metal members engaging the external surface of said shell at areas opposite said metal elements, and electric resistance welds integrally joining said elements and sheet metal members through said shell, said sheet metal elements being of an area materially greater than the area of the respective welds for restraining those portions of said shell which immediately surround said wells against vibration.

2. In a device having a tubular portion and a thin gauge sheet metal shell surrounding said tubular portion in spaced relation, V-shaped spacing elements between said shell and tubular portion at one end thereof, each spacing element having one leg portion secured to said tubular portion by at least one electric resistance weld, and means for securing the other leg portion of each spacing element to said shell, comprising a thin gauge sheet metal member engaging said shell at a region opposite said last-named leg portion, and an electric resistance weld integrally uniting said thin gauge member and last-named leg portion through said shell, said sheet metal member being of sufficient area to restrain the portion of the shell immediately surrounding the weld against vibration.

MICHAEL WATTER.